US009045093B2

(12) United States Patent
Dobrow et al.

(10) Patent No.: US 9,045,093 B2
(45) Date of Patent: Jun. 2, 2015

(54) TRAILER WIRING OVER-CURRENT PROTECTION

(71) Applicant: Grote Industries, Inc., Madison, IN (US)

(72) Inventors: Robert H. Dobrow, McKinney, TX (US); Timothy W. Brooks, Madison, IN (US); Darren L. Harmon, Madison, IN (US); Alfredo H. Hernandez, Nuevo Leon (MX); Shelly Ong, Madison, IN (US); Eric Thorstensen, Madison, IN (US)

(73) Assignee: Grote Industries, Inc., Madison, IN (US)

( * ) Notice: Subject to any disclaimer, the term of this patent is extended or adjusted under 35 U.S.C. 154(b) by 222 days.

(21) Appl. No.: 13/826,681

(22) Filed: Mar. 14, 2013

(65) Prior Publication Data

US 2014/0265837 A1 Sep. 18, 2014

(51) Int. Cl.
*B60Q 1/14* (2006.01)
*B60R 16/02* (2006.01)

(52) U.S. Cl.
CPC .................................. *B60R 16/0215* (2013.01)

(58) Field of Classification Search
USPC ...................... 315/77; 307/9.1, 10.1, 10.8, 11
See application file for complete search history.

(56) References Cited

U.S. PATENT DOCUMENTS

| | | | |
|---|---|---|---|
| 5,497,304 A | 3/1996 | Caine | |
| 5,567,036 A | 10/1996 | Theobald et al. | |
| 5,632,551 A | 5/1997 | Roney et al. | |
| 5,666,103 A | 9/1997 | Davis, Jr. | |
| 6,641,288 B1 | 11/2003 | Olsen | |
| 6,714,128 B2 | 3/2004 | Abbe et al. | |
| 6,858,986 B2 | 2/2005 | Monk | |
| 6,977,584 B2 | 12/2005 | Milliken | |
| 7,017,933 B2 | 3/2006 | Mickley | |
| 7,237,932 B2 | 7/2007 | Ter-Hovhannissian | |
| 7,403,100 B2 | 7/2008 | Peterson | |
| 7,482,756 B2 | 1/2009 | Kesterson | |
| 7,714,516 B2 | 5/2010 | Ito et al. | |
| 7,755,293 B2 | 7/2010 | Li et al. | |
| 7,837,365 B1 * | 11/2010 | Sisko | 362/485 |
| 7,868,555 B2 | 1/2011 | Peron et al. | |
| 7,902,758 B2 | 3/2011 | Woodward et al. | |
| 7,919,925 B2 | 4/2011 | Ito et al. | |
| 8,061,879 B2 | 11/2011 | Simmons et al. | |
| 8,120,201 B2 | 2/2012 | Fujino | |
| 8,129,909 B1 | 3/2012 | Hoekstra | |
| 2003/0189836 A1 * | 10/2003 | Sparling et al. | 362/485 |

(Continued)

OTHER PUBLICATIONS

Engineering Drawing of "Mini Circuit Breaker," Grote Industries, LLC, Sep. 16, 2008.

*Primary Examiner* — Adam Houston
(74) *Attorney, Agent, or Firm* — Woodard, Emhardt, Moriarty, McNett & Henry LLP

(57) ABSTRACT

An electrical power supply device for a trailer lighting system behind a truck is disclosed. The trailer lighting system including at least two FMVSS 108 compliant LED stop-tail-turn lamps. The electrical power supply device has an outer casing including a terminal to be electrically attached to and become part of the trailer lighting system. There are a plurality of electrically conductive wires within the casing. At least one of the wires is selected from one or more of the group consisting of low copper usage wire. The device has an over-current protection device along at least one which breaks current flow through the one wire below at an amperage threshold less than 25 amperes.

18 Claims, 8 Drawing Sheets

(56) References Cited

U.S. PATENT DOCUMENTS

| | | | |
|---|---|---|---|
| 2007/0139942 A1* | 6/2007 | Rowland et al. | 362/477 |
| 2012/0268960 A1 | 10/2012 | Kiser | |
| 2013/0078075 A1* | 3/2013 | Francois | 414/800 |
| 2013/0249479 A1* | 9/2013 | Partovi | 320/108 |
| 2013/0257144 A1* | 10/2013 | Caldeira et al. | 307/9.1 |
| 2013/0285604 A1* | 10/2013 | Partovi | 320/108 |
| 2014/0265837 A1* | 9/2014 | Dobrow et al. | 315/77 |
| 2015/0015197 A1* | 1/2015 | Mi et al. | 320/108 |

* cited by examiner

TRAILER WIRING OVER-CURRENT PROTECTION

BACKGROUND

The present invention relates to vehicle wiring, and more specifically to reducing usage of copper metal in trailer lighting systems.

Vehicle lighting systems required wiring to supply current to the individual lamps within the vehicle. In the case of large tractor trailers in Class 8, the wiring harnesses typically employ large diameter copper conductors which are sized to handle the high current requirements of traditional incandescent lighting. For example, typically, for a 7-Conductor cable (per SAE J1067 and J560) the ground wire is typically 8 or 10 gauge, and the other wires are typically 10 or 12 gauge, typically all being copper wire. A typical main harness, which extends from the nose box back is typically 8 to 12 gauge of copper, with typical lengths of, for example, about 35, 50, 60 or 100 feet. The prior art includes the Grote Nose-Box Jumper Harness with 10 and 12 gauge copper wire and 25 amp breakers. Due to their large diameter and high conductivity, such copper conductors will also typically draw more than 25 amps of current if a short circuit develops at the rear end of the trailer. Since most tractors include a 25 amp breakers, the tractor and trailer wiring are protected from such failure conditions.

We have discovered how to improve on the environment by using less copper, save on the cost of copper, and yet reduce risk of short circuit problems in the context of some Class 8 truck trailers.

When LED lighting is used in the trailer, the current required to run the LED lamps is much less than that of incandescent lighting. Therefore, we can take advantage by the use of, for example, smaller diameter copper conductors and/or alloys using less copper, metals or alloys using no copper, and/or other approaches, such as copper sheathing, to reduce copper usage. However, we have realized that this approach, while beneficial, can give rise to one or more disadvantages. First, the increased resistance of the smaller (or otherwise less conductive) conductor can restrict the possible short circuit current to a level which is too low to trip the 25 amp breaker in a typical tractor pulling the trailer. For example, if 20 AWG conductor is used, a short that occurs 50 feet from the trailer nose box would draw 18 amps, high enough to potentially melt the wiring insulation, but below the 25 amps required to trip the typical breaker in the tractor. Smaller conductor wiring will also typically have thinner insulation and will be less rigid. This loss of rigidity makes it harder to install the wiring during the trailer manufacturing process and increase the associated labor costs.

Thus, there is a need for improvement in this field.

SUMMARY

The invention is set forth by the claims and only the claims. Generally, it can be summarized as an electrical power supply device for a trailer lighting system behind a truck. The trailer lighting system including at least two FMVSS 108 compliant LED stop-tail-turn lamps with an amperage less than 3 amperes. It an outer casing including a terminal to be electrically attached to and become part of the trailer lighting system. There are a plurality of electrically conductive wires within the casing. At least one of the wires is selected from one or more of the group consisting of: (a) consisting essentially of copper and being smaller in cross-sectional size than 14 gauge; (b) being non-copper and having conductivity less than copper; (c) being a copper alloy and having conductivity less than copper; (d) copper sheath around a different metal and collectively having conductivity less than copper. The device has an over-current protection device along at least one which breaks current flow through the one wire below at an amperage threshold less than 25 amperes.

The invention solves the problem of providing beneficial reduced copper usage while addressing related issues arising therefrom. Further forms, objects, features, aspects, benefits, advantages, and embodiments of the present invention will become apparent from the detailed description and drawings provided herewith.

DESCRIPTION OF THE SELECTED EMBODIMENTS

Figure 1:
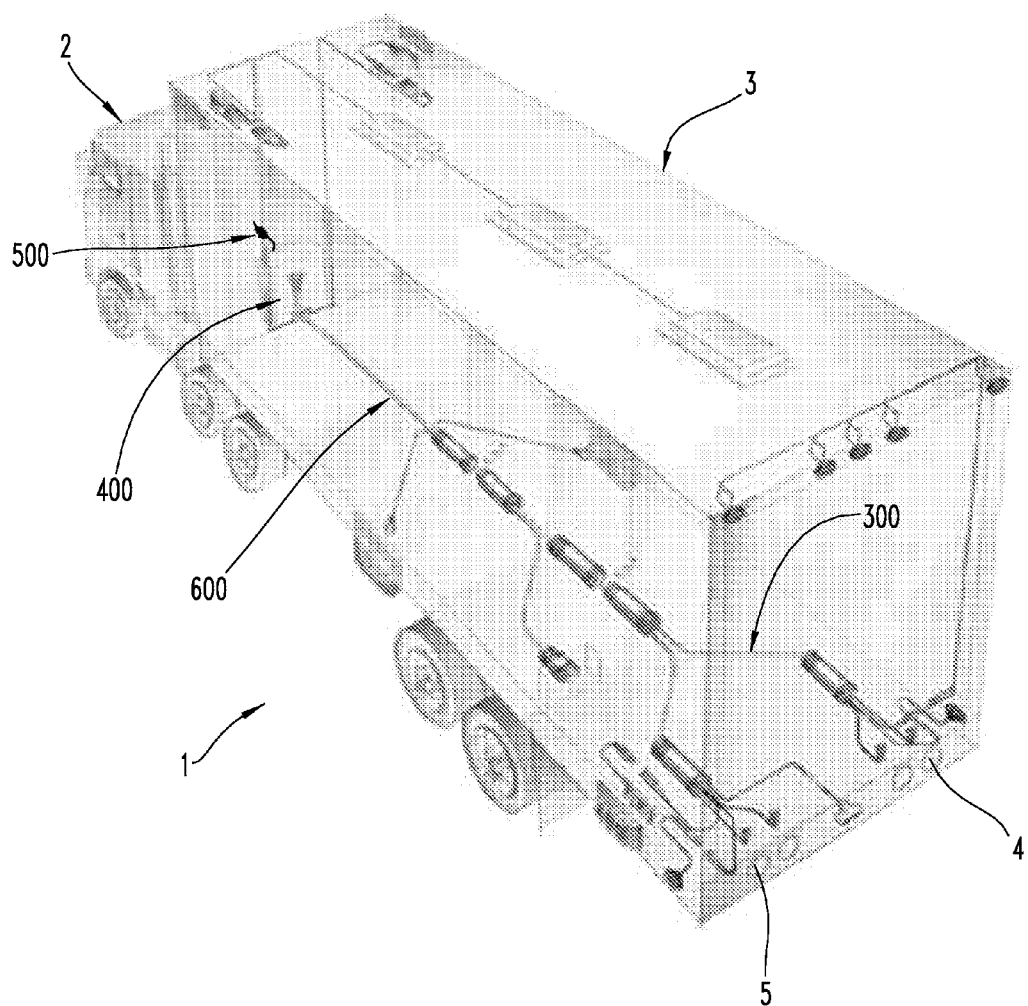
FIG. 1 is a rear perspective view of a Class 8 trailer including an electrical lighting system.
Figure 2A:
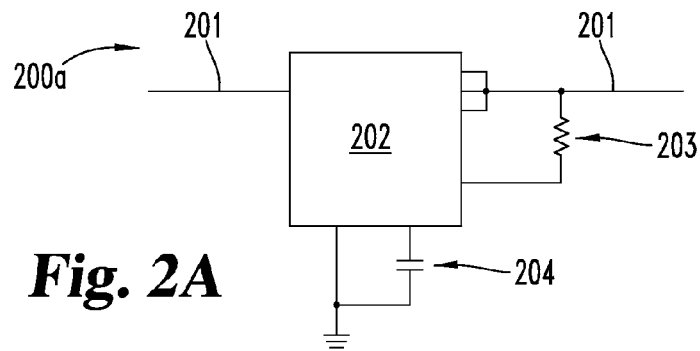
FIG. 2A is a first example of an over-current protection device.
Figure 2B:
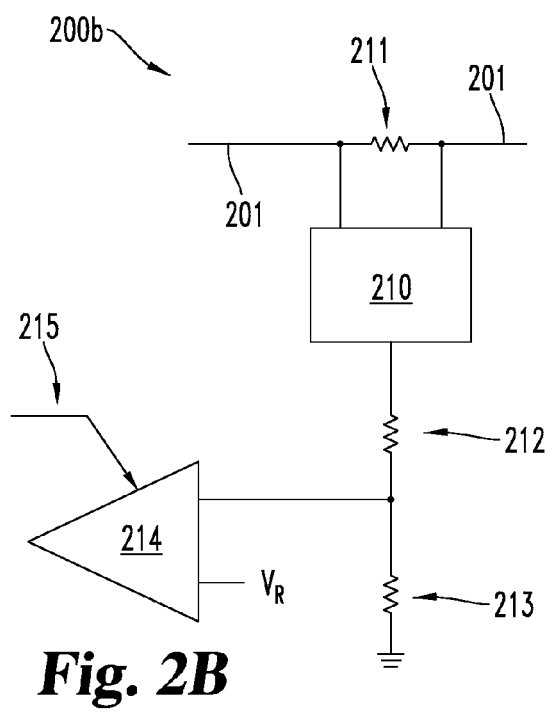
FIG. 2B is a second example of an over-current protection device.
Figure 2C:
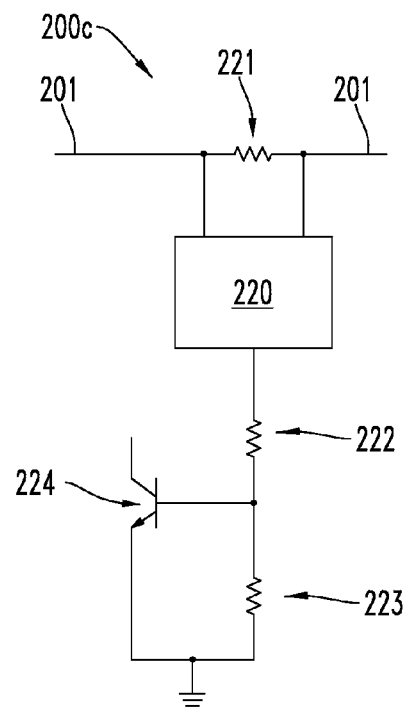
FIG. 2C is a third example of an over-current protection device.
Figure 2D:
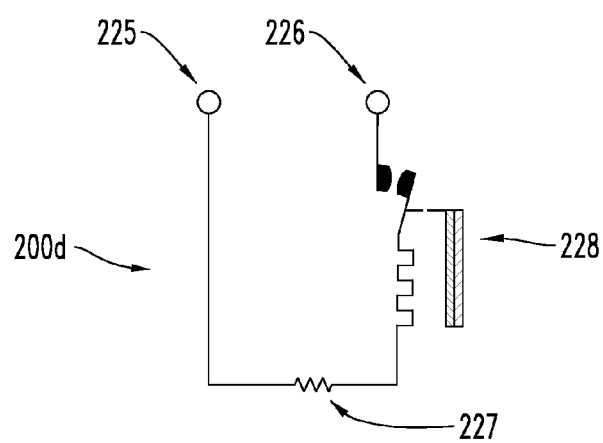
FIG. 2D is a fourth example of an over-current protection device.
Figure 3:
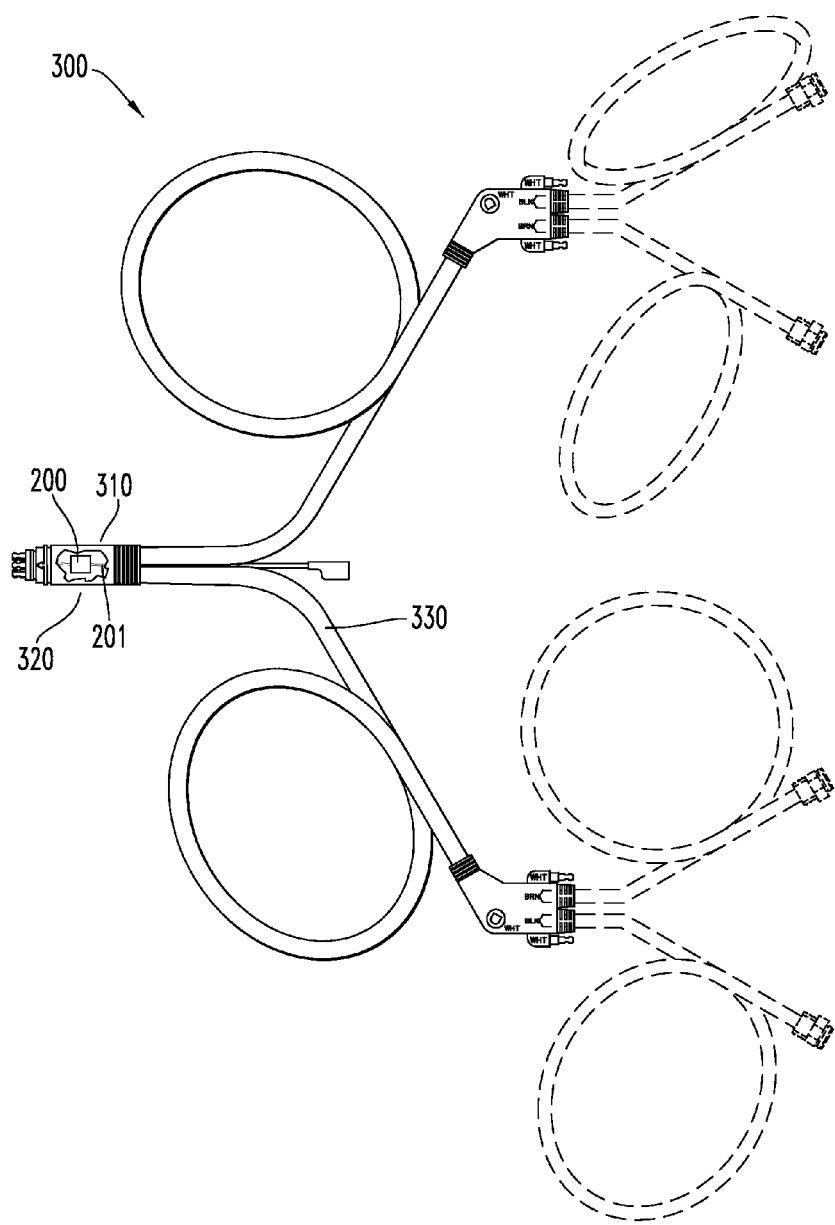
FIG. 3 is a partially cut-away view of a trailer wiring harness.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring to FIGS. 1-6 and FIGS. 7B and 7C and FIGS. 8A-C and FIG. 9, some examples of the invention are shown. Various examples are shown with similar reference figures, but with the hundred's digit prefix otherwise varied. Hence, the drawings show device 300, 400, 500, 600, 800, 900 as examples, each having one or more over-current protection device 200. Otherwise, for such device examples the reference characters in the ten's and one's digits, when the same, are the same or similar.

FIG. 1 shows a vehicle 1 with one or more electrical power supply devices 300, 400, 500, 600, 800, 900 for a Class 8 trailer 3 lighting system behind a truck 2. The trailer lighting system including at least two FMVSS 108 compliant LED stop-tail-turn lamps 4, 5 while each uses an amperage less than 3 amperes.

The devices 300, 400, 500, 600, 800, 900 have an outer casing, such as for example casing(s) 310, 410, 510, 610, 810 (including one or more of 810a-d) including a terminal 320, 420, 520, 620, 820a, 820b adapted to be electrically attached to and become part of said Class 8 trailer lighting system. There are a plurality of electrically conductive wires, such as wire 201, within the casing. At least one of the wires is selected from one or more of the group consisting of: (a) consisting essentially of copper and being smaller in cross-sectional size than 14 gauge; (b) being non-copper and having conductivity less than copper; (c) being a copper alloy and having conductivity less than copper; (d) copper sheath around a different metal and collectively having conductivity less than copper.

Figure 8A:
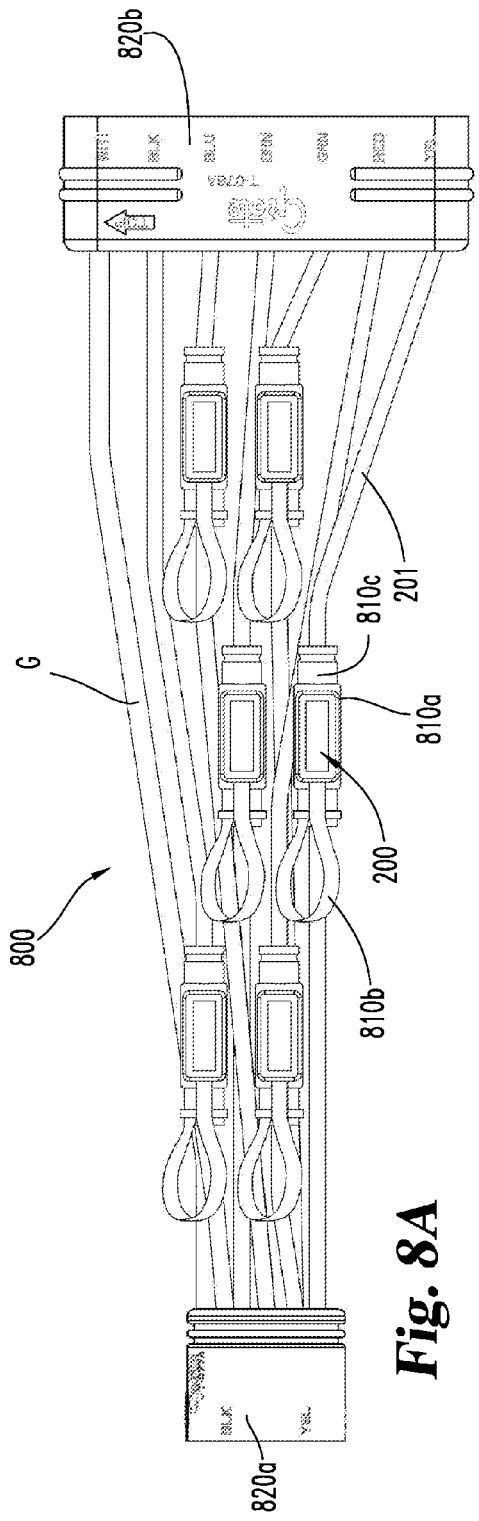
FIG. 8A is a plan view of another trailer wiring harness.
Figure 8C:
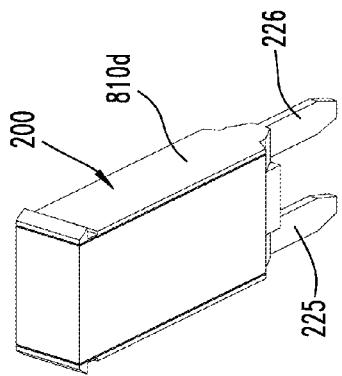
FIG. 8C is a perspective view of a circuit breaker for use in the device of FIGS. 8A and 8B and in the device of FIG. 9.
Figure 8B:
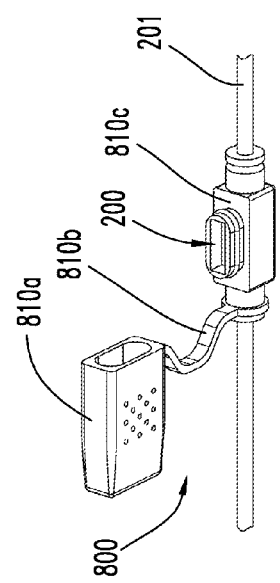
FIG. 8B is a perspective view of part of the harness of FIG. 8A in isolation.
Figure 9:
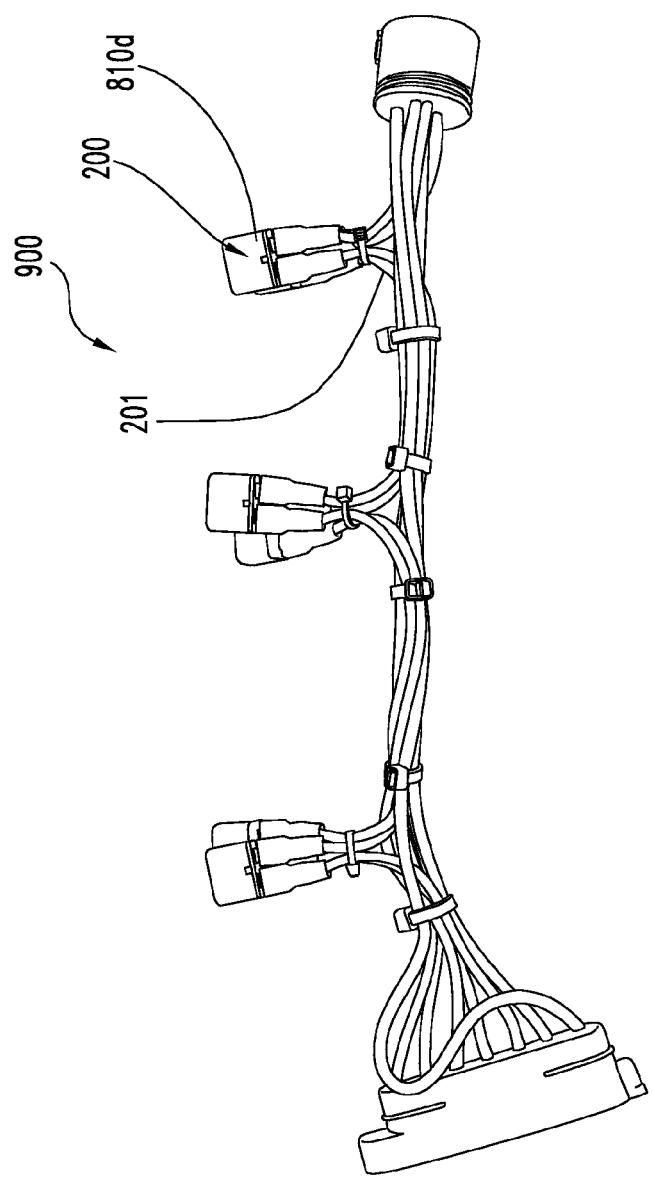
FIG. 9 is a perspective view of another trailer wiring harness.

The devices 300, 400, 500, 600, 800, 900 have an over-current protection device 200 along at least one wire, such as for example, wire 201, which breaks current flow through the one wire below at an amperage threshold less than 25 amperes. The over-current protection device is mounted on or within said outer casing and is, preferably, substantially protected from dust or moisture. This optionally may, for example, be made on or in a terminal, such as terminal 320 shown in FIG. 3 or terminal 520 in FIG. 5, in either terminal 420 in FIG. 4, elsewhere on or in casing 410 in FIG. 4, in its own casing 610 apart from terminal 620, in a stand alone casing with male and/or female electrical terminal receptacles at opposite ends, and/or otherwise. Another example is shown in FIGS. 8A-C. This shows a 7-wire harness (one of which is ground G, denoted a "white" wire), and six other wires, such as wire 201, between terminal 820a and terminal 820b. Casing 810c is provided. It is adapted to receive over-current protection device 200, removably inserted therein, also having casing 810d. Optionally, there is casing cover 810a optionally having lanyard 810b to provide removable access to within casing 810c. As seen in FIG. 8C, the over-current protection device 200 may have connections 225 and 226, which may, for example, correspond to those items in schematic FIG. 2D. Device 900 in FIG. 9 is similar to device 800, except that optionally over-current protection device 200, with casing 810d, is plugged into female connectors without the presence of optional casing 810a and 810c. FIGS. 8A and 9 illustrate more than one over-current protection devices, and in those examples six (6), over-current protection devices. The same, or more, or less, wires and/or over-current protection device(s) is also optionally available in the other devices illustrated and/or described herein.

Any over-current protection device as defined which breaks current flow through said at least one wire below at an amperage threshold less than 25 amperes is acceptable. As mere examples, over-current protection device 200 is shown with various optional circuits 200a, 200b, 200c and 200d (in FIGS. 2A, 2B, 2C and 2D, respectively) along wire 201, with the standard ground symbol as shown. Note, in these examples, current flow along wire 201 is left to right with the trailer, or at least the LED lamps in the trailer, being to the right. Example circuit 200a includes solid state device 202 (such as, for example, an NIS5112 electronic fuse), resistor 203 and capacitor 204. Example circuit 200b includes solid state device 210 (such as, for example, a ZXCT1009 high-side current monitor), resistors 211, 212 and 213, amplifier 214 (with input 215 and voltage $V_R$). Example circuit 200c includes solid state device 220 (such as, for example, a ZXCT1009 high-side current monitor), resistors 221, 222 and 223, transistor 224. Example circuit 200d includes line 225 and neutral 225, resistor 227, and thermal circuit breaker 228 (having, for example, a bi-metal element near a heat to move a movable contact away from a stationary contact while heated). Other solid-state and/or non-solid state over-current protection devices, such as those known to a person of ordinary skill in this art, are also usable.

Figure 4:
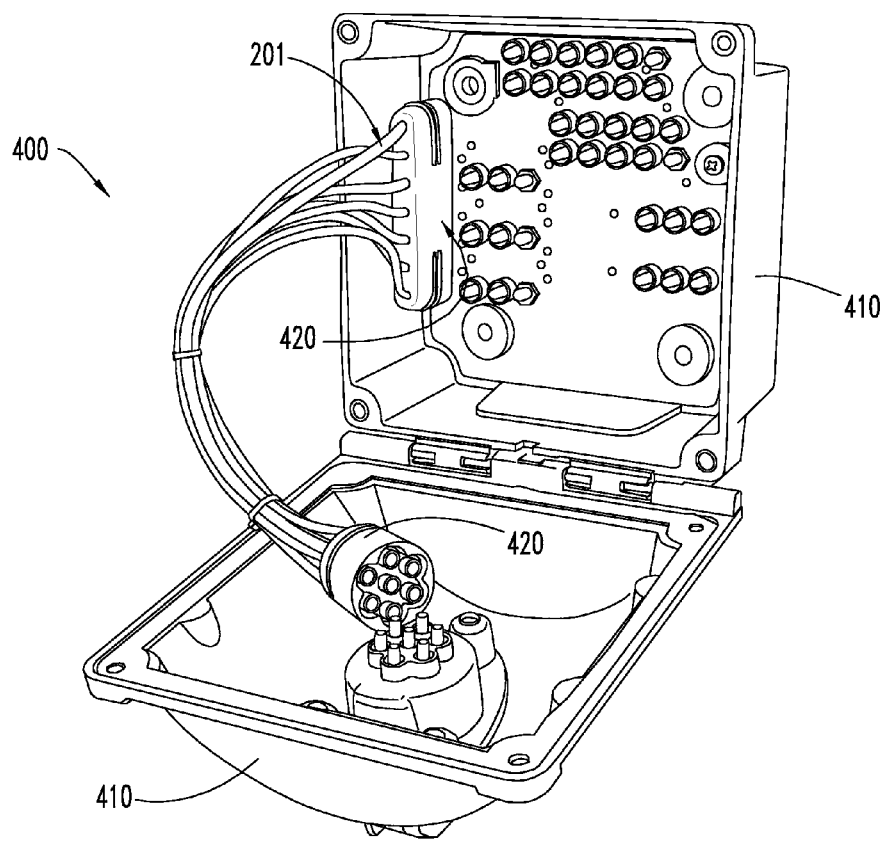
FIG. 4 is a perspective view of a trailer nose box.
Figure 5:
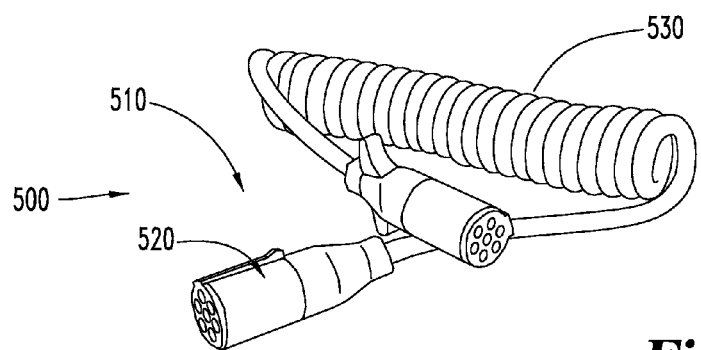
FIG. 5 is a perspective view of a trailer coil cord.
Figure 6:
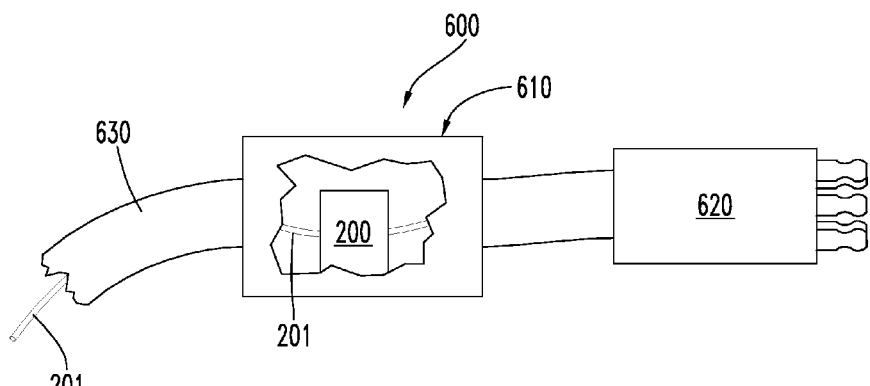
FIG. 6 is a partially cut-away view of a casing along a cord.

The devices may optionally be such that, for example, the outer casing is or is within a trailer nose box 410, (FIG. 4). This may include, for example, harness 800 (FIGS. 8A-C) or harness 900 (FIG. 9) within a nose box or elsewhere on-board the trailer. The device may optionally be a trailer coil cord 500 adapted to electrically connect a trailer nose box to a truck, an electrical wiring harness 300, (FIGS. 1 and 3) and/or harness 600 (FIGS. 1 and 6) adapted to be electrically connected on-board the trailer between a trailer nose box and the LED lamps 4 and 5.

Optionally, the device may be such that the outer casing 610, or 810a-d, is a separate component, with the device also having a first terminal and a second terminal and being adapted to be electrically connected in series with a trailer nose box and on-board the trailer between the trailer nose box and the LED lamps. This may, for example, be part of a harness, or a stand alone device, such as for plugging in, in series, between two otherwise connected terminals. This may, for example, be in-between the normal junctures of truck-trailer coil cord, trailer coil cord-nose box; nose box-main harness; main harness-other harness (such as, for example, back sill harness), and otherwise.

Optionally, but preferably, the device is used in connection with a trailer electrical system includes wiring running at least 50 feet from a trailer nose box to said LED stop-tail-turn lamp.

Figure 7A:
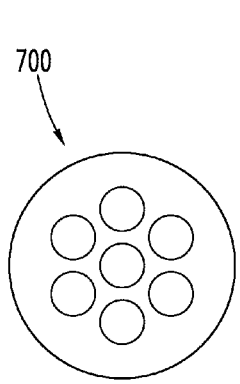
FIGS. 7A-C are cross-sectional views of various electrical cords.
Figure 7B:
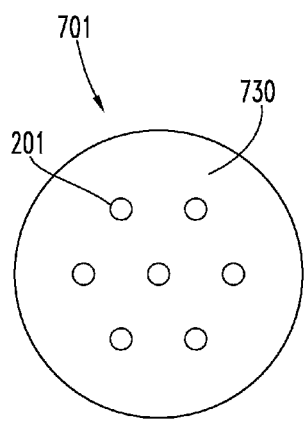
Figure 7C:
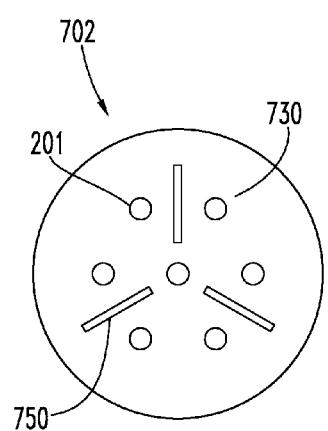

Optionally, but preferably, the device is flexible along its length but includes one or both of stiff insulation around the wires; and/or a longitudinal stiffener member parallel to the wires, such that the harness is mechanically stiff enough to be pushed from one end through a conduit on the trailer. Examples of this are seen by comparing FIG. 7A with FIG. 7B or 7C, all showing examples of a multi-wire cord, including insulation around a group of wires in cross-section. FIG. 7A is schematically typical of a prior art cord 700 with heavier 10 and/or 12 gauge wires (7 wires in this example), each having individual insulation and having a cord insulation around that group. FIG. 7B shows the use of smaller, 15 gauge wires, in cord 701. Since they are smaller and less stiff than the wires in FIG. 7A, additional insulation 730 is optionally used, as shown by cord 701 having a comparatively larger diameter than cord 700. Also, or instead, as shown in FIG. 7B, the individual wires spread out more with respect to each other, thereby further increasing the cross-sectional moment of inertia, and thereby increasing stiffness. Also, optionally, one or more stiffeners, such as stiffener 750, may added to insulation 730 or otherwise along cord 702, thereby increasing stiffness. Such stiffeners may be any material, but preferably are low cost (lower cost than copper wire) and electrically insulating, such as a stiff polymer.

Optionally, other features may (or may not) be included. These may include, for examples, the device with: a short-circuit indicator, in the form of a wire carried signal, RF signal, visual indicator on the device itself, or otherwise; and/or, on/off or over-ride switch which by-passes or over-rides the over-current protection device.

Articles and phases such as, "the", "a", "an", "at least one", and "a first", are not limited to mean only one, but rather are inclusive and open ended to also include, optionally, two or more of such elements. In terms of the meaning of words herein, literally different elements or words in dependent claims are not superfluous, and have different meaning and are not to be imported or implied or synonymous with elements or words in the claims from which they depend.

The term "amperage threshold" here means a power value, expressed in amps or amperes of electricity when passed through a resistance, measured at the vehicle industry standard design voltage of 12.8 volts.

The term "breaks current flow" here means to stop, or at least greatly impede, the flow of electrical current. This can be temporary or permanent.

The term "Class 8 trailer" here means, per the U.S. Department of Transportation Heavy Duty Classification, a trailer or trailers pulled behind a truck wherein the gross vehicle weight rating is above 33,000 pounds (14,969 kg).

The term "conductivity" here means the inverse of resistivity.

The term "dust" here means environmental dirt, grime and airborne particles.

The term "electrical wiring harness" here means an assembly of insulation, wire and terminals for providing electricity to lamps, lighting and/or other components on-board a trailer. It may include, but is not limited to a main harness, a rear sill harness, and a jumper harness. It may optionally provide signal and/or other communication connection(s) as well.

The term "gauge" here means the standard American Wire Gauge ("AWG") cross-sectional size or its cross-sectional area equivalent. For example, 14 gauge, or AWG 14, corresponds to a circle having a diameter of 1.63 millimeters. For example, 15 gauge, or AWG 15, corresponds to a circle having a diameter of 1.45 millimeters.

The term "FMVSS 108 compliant" here means, meeting the candela, illuminated surface area and other requirements set forth by U.S. 49 C.F.R. §571.108.

The term "Illuminated surface area" here means, per 49 C.F.R. §571.108, the Effective projected luminous lens area (EPLLA), which means the area of the orthogonal projection of the effective light-emitting surface of a lamp on a plane perpendicular to a defined direction relative to the axis of reference. Unless otherwise specified, the direction is coincident with the axis of reference.

The term "insulation" here means material that does not conduct any meaningful amount of electrical current. It often is or includes, but is not limited to, plastic.

The term "LED" here means light emitting diode, including single diodes as well as arrays of LED's and/or grouped light emitting diodes. This can include the die and/or and LED film or other laminate, LED packages, said packages may include encapsulating material around a die, and the material, typically transparent, may or may not have color tinting and/or may or may not have a colored sub-cover. An LED can be a variety of colors, shapes, sizes and designs, including with or without heat sinking, lenses, or reflectors, built into a package.

The term "main harness" here means an electrical wiring harness extending from the trailer nose box (with or without intervening component(s)) and provides connection to reward components, such as for example a rear sill harness, or to another trailer.

The term "moisture" here means water or other liquid or vapor-condensate.

The term "mounted" here means physically attached to or held in place by. This may be by fasteners, adhesives, conduits, brackets, over molded plastic, or otherwise.

The term "outer casing" here means a physical housing, terminal, insulation or sheath on the outside of a component, exposed to the surrounding environment such as outdoors and/or the inside of a trailer or trailer conduit.

The term "on-board the trailer" here means part of the trailer (inside, outside or both) and not inside a truck.

The term "over-current protection device" here means any one or more devices, components and/or circuits that break current flow in response to current at or above a predetermined value or parameter. This includes, without limitation, circuit breakers, fuses, solid state devices, circuits (see for example FIGS. 2A-C), and otherwise.

The term "resistivity" here means how strongly a given material opposes the flow of electric current. For examples, copper has a resistivity of $1.68 \times 10^{-8}$ ohm meters; and, aluminum has a resistivity of $2.82 \times 10^{-8}$ ohm meters.

The term "resistance" here means, in ohms, for a wire the resistivity times length, divided by cross-sectional area.

The term "sheath" here means a layer or group of strands running along the length of another structure and located, cross-sectionals, at or near the other structure's outer surface and surrounding most or all of the other structure's periphery. This includes, for example, cladding around and along a wire, wire strands around a core, and otherwise.

The terms "stop-tail-turn" lamp or "STT" here means a lamp which is compliant with present legal and/or regulatory requirements in this country such as illuminated surface area, candela, and otherwise.

The term "terminal" here means a plug, socket or other connection (male, female, mixed, hermaphroditic, or otherwise) for mechanically and electrically connecting two or more wires or other conductors.

The term "trailer coil cord" here means a helical cord for electrically connecting either a truck to a trailer or a trailer to another trailer.

The term "trailer nose box" here means a housing and electrical components therein located at the front end of a trailer for providing electrical connections for lighting on-board the trailer The term "truck" here means a powered truck (also known as a tractor or cab) for pulling one or more trailer(s).

The term "wire" here means elongated electrically conductive metal(s). This includes an individual strand, multiple strands (twisted, braided and/or not), traces, strips and other cross-sectional geometries.

The language used in the claims and the written description and in the above definitions is to only have its plain and ordinary meaning, except for terms explicitly defined above. Such plain and ordinary meaning is defined here as inclusive of all consistent dictionary definitions from the most recently published (on the filing date of this document) general purpose Webster's dictionaries and Random House dictionaries.

While the invention has been illustrated and described in detail in the drawings and foregoing description, the same is to be considered as illustrative and not restrictive in character, it being understood that only preferred embodiments or examples have been shown and described and that all changes, equivalents, and modifications that come within the spirit of the inventions in the following claims are to be protected.

What is claimed is:

1. An electrical power supply device for a Class 8 trailer lighting system behind a truck, said trailer lighting system including at least two FMVSS 108 compliant LED stop-tail-turn lamps while each uses an amperage less than 3 amperes, the improvement comprising:
   an outer casing including a terminal adapted to be electrically attached to and become part of said Class 8 trailer lighting system;
   a plurality of electrically conductive wires within said casing;

wherein at least one of said wires is selected from one or more of the group consisting of: (a) consisting essentially of copper and being smaller in cross-sectional size than 14 gauge; (b) being non-copper and having conductivity less than copper; (c) being a copper alloy and having conductivity less than copper; (d) copper sheath around a different metal and collectively having conductivity less than copper;

an over-current protection device along said at least one wire which breaks current flow through said at least one wire below at an amperage threshold less than 25 amperes; and, wherein said over-current protection device is mounted on or within said outer casing and is substantially protected from dust or moisture.

2. The device of claim 1 wherein said outer casing is a trailer nose box.

3. The device of claim 1 wherein said outer casing is a trailer coil cord adapted to electrically connect a trailer nose box to a truck.

4. The device of claim 1 wherein said outer casing is an electrical wiring harness adapted to be electrically connected on-board the trailer between a trailer nose box and the LED lamps.

5. The device of claim 1 wherein said outer casing is a separate component having a first terminal and a second terminal and is adapted to be electrically connected in series with a trailer nose box and on-board the trailer between the trailer nose box and the LED lamps.

6. The device of claim 1 wherein said wire consists essentially of copper and being smaller in cross-sectional size than 14 gauge.

7. The device of claim 1 wherein said wire is non-copper and has conductivity less than copper.

8. The device of claim 1 wherein said wire comprises a copper alloy having conductivity less than copper.

9. The device of claim 1 wherein said wire comprises copper sheath around a different metal and collectivity have conductivity less than copper.

10. The device of claim 1 wherein said trailer electrical system includes wiring running at least 50 feet from a trailer nose box to said LED stop-tail-turn lamp.

11. The device of claim 4 wherein said harness is flexible along its length but includes one or both of:
(a) stiff insulation around said wires;
(b) a longitudinal stiffener member parallel to said wires, such that the harness is mechanically stiff enough to be pushed from one end through a conduit on the trailer.

12. The device of claim 6 wherein said outer casing is a trailer nose box.

13. The device of claim 6 wherein said outer casing is a trailer coil cord adapted to electrically connect a trailer nose box to a truck.

14. The device of claim 6 wherein said outer casing is an electrical wiring harness adapted to be electrically connected on-board the trailer between a trailer nose box and the LED lamps.

15. The device of claim 12 wherein said harness is flexible along its length but includes one or both of:
(a) stiff insulation around said wires;
(b) a longitudinal stiffener member parallel to said wires, such that the harness is mechanically stiff enough to be pushed from one end through a conduit on the trailer.

16. The device of claim 13 wherein said harness is flexible along its length but includes one or both of:
(a) stiff insulation around said wires;
(b) a longitudinal stiffener member parallel to said wires, such that the harness is mechanically stiff enough to be pushed from one end through a conduit on the trailer.

17. The device of claim 14 wherein said harness is flexible along its length but includes one or both of:
(a) stiff insulation around said wires;
(b) a longitudinal stiffener member parallel to said wires, such that the harness is mechanically stiff enough to be pushed from one end through a conduit on the trailer.

18. An electrical power supply device for a Class 8 trailer lighting system behind a truck, said trailer lighting system including at least two FMVSS 108 compliant LED stop-tail-turn lamps while each uses an amperage less than 3 amperes, the improvement comprising:

outer casing means including terminal means adapted to be electrically attached to and become part of said Class 8 trailer lighting system;

a plurality of wire means for conducting electrically within said casing;

wherein at least one of said wire means is selected from one or more of the group consisting of: (a) consisting essentially of copper and being smaller in cross-sectional size than 14 gauge; (b) being non-copper and having conductivity less than copper; (c) being a copper alloy and having conductivity less than copper; (d) copper sheath around a different metal and collectively having conductivity less than copper;

means for over-current protection along said at least one wire which breaks current flow through said at least one wire below at an amperage threshold less than 25 amperes; and, wherein said over-current protection means is mounted on or within said outer casing.

* * * * *